March 2, 1926.
O. W. HOWARD
DISK PLOW
Filed Sept. 16, 1922
1,574,974
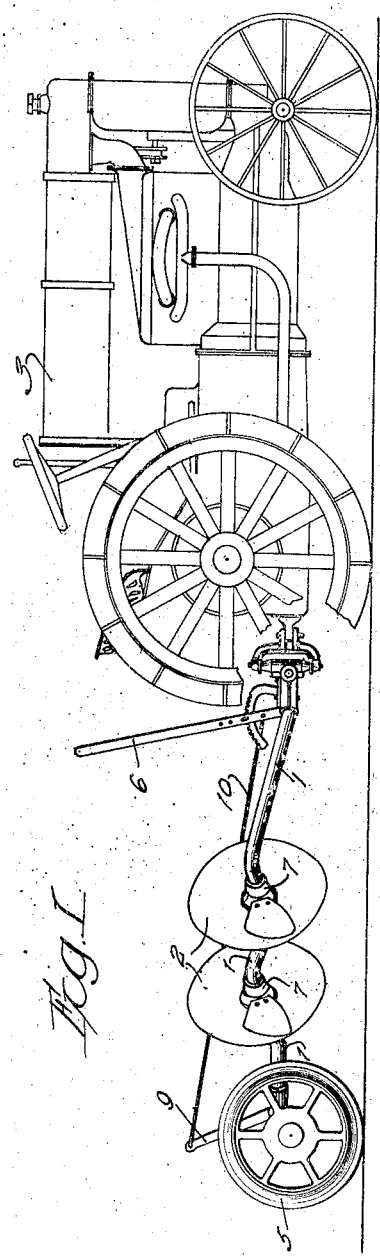
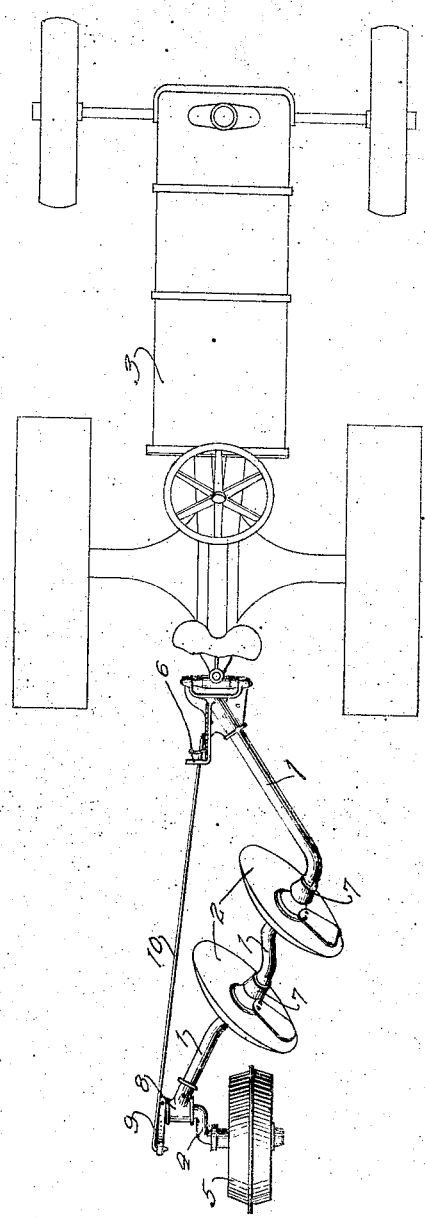
Inventor:
Otis W. Howard
by L.C. Shonts
Atty.

Patented Mar. 2, 1926.

1,574,974

UNITED STATES PATENT OFFICE.

OTIS W. HOWARD, OF MOLINE, ILLINOIS, ASSIGNOR, BY MESNE ASSIGNMENTS, TO MOLINE IMPLEMENT COMPANY, A CORPORATION OF ILLINOIS.

DISK PLOW.

Application filed September 16, 1922. Serial No. 588,702.

*To all whom it may concern:*

Be it known that I, OTIS W. HOWARD, a citizen of the United States, residing at Moline, county of Rock Island, State of Illinois, have invented certain new and useful Improvements in Disk Plows, of which the following is a specification.

The invention relates to disk plows.

It relates particularly to disk plows for use with tractors.

Disk plows are usually built with heavy frames with a rear furrow wheel and a rear land wheel as well as a front furrow wheel. All these parts are made heavy so as to keep the plow in the ground and to prevent it from moving sidewise. The plow is usually clumsy in appearance, difficult to handle, and the amount of material put into it as well as the difficulty of manufacturing, makes it relatively expensive.

The present invention has been devised with a view to eliminating as much as possible of this weight, thereby reducing the cost of the plow and making it easier to operate. In accomplishing this result, the weight of the tractor has been utilized for holding the front end of the plow in the ground and for preventing it from moving sidewise.

The general object of the invention is to provide an improved light tractor disk plow.

A further object is to provide a light tractor disk plow, the rear end of which is supported by only one wheel.

Other objects and advantages of the invention will hereinafter appear.

An embodiment of the invention is illustrated in the drawings in which,

Figure 1 is a side elevation of the plow connected to a tractor.

Figure 2 is a plan view.

The plow comprises, in general, a beam 1 carrying a plurality of plowing disks 2, the front end of the beam being connected directly to a tractor 3 and the rear end being supported by a crank axle 4 and a single ground wheel 5. The height of the ground wheel may be adjusted by means of the lever 6.

The beam 1 is of any suitable construction, preferably being made out of a round metal bar, the front end of which is connected to the tractor draw bar in any suitable manner as, for example, through a universal joint 6.

The plowing disks 2 are of the usual type, but instead of being mounted upon brackets or arms extending out from the beam, they are mounted directly on the beam with the axes of the disks substantially coincident with the axis of the beam. The disks themselves are mounted on bearings 7 on the beam, the bearings being adjustable about both vertical and horizontal axes by means of a ball and socket connection.

The crank axle 4 is journaled in a bearing 8 mounted on the end of the beam 1. It carries the ground wheel 5 and also has an arm 9 to which is connected a link 10 attached to the lever 6. By adjusting the lever 6, the crank axle 4 may be swung to raise and lower the rear end of the beam. During such operation, the beam swings about its pivot to the tractor.

The important feature of this construction is its simplicity. The desired result in disk plowing is secured by the elimination of a large number of parts. In other words, a new combination has been produced in which the same result is accomplished with fewer elements. Instead of having two rear wheels and a heavy frame and one or more front wheels with a heavy draft device, the plow has only one rear wheel, no heavy frame, and no front wheels or draft device. The weight of the tractor is utilized for keeping the front end of the plow down and for keeping it from moving sidewise. The rear wheel runs in a furrow and is sufficiently heavy to keep the rear end of the beam down. It also prevents sidewise movement by its weight and by the fact that it will bear against the walls of the furrow. The brackets or arms that are usually attached to the beam for carrying the plowing disks have been eliminated and the disks mounted directly upon the beam itself.

It is to be understood that the construction shown is for purposes of illustration and that variations may be made in it without departing from the spirit and scope of the invention.

I claim:

1. A frameless, disk plow having a single beam carrying plowing disks, connecting means attached to the forward end of the beam for connecting it to the draw-bar of a tractor so that the forward end of the beam is supported by the tractor, said means including pivotal connections which permit the beams to move relative to the tractor about both a horizontal and a vertical axis, a crank axle carrying a ground wheel for supporting the rear end of the beam, a lever mounted at the forward end of the beam, and connections between the lever and the crank axle for rocking the crank axle to raise and lower the plow.

2. A frameless disk plow having a single beam carrying plowing disks, said beam being bent at an angle and having the disks on one of the arms of the angle, connecting means for connecting the front end of the beam to the draw bar of a tractor so that the beam may be supported directly by the tractor, said means including pivotal connections which permit the beam to move relative to the tractor about both a vertical and a horizontal axis, a crank axle journalled to the rear end of the beam and carrying a ground wheel, a lever mounted at the forward end of the beam where it may be manipulated by an operator on the seat of the tractor to which a plow may be connected, and connecting means between the lever and the crank axle to rock the crank axle to raise and lower the rear end of the beam.

In testimony whereof, I affix my signature.

OTIS W. HOWARD.